Dec. 28, 1948.    W. W. SLOANE    2,457,326
TROLLEY GLIDER
Filed March 2, 1945

INVENTOR
William W. Sloane
Clarence F. Poole
ATTORNEY

Patented Dec. 28, 1948

2,457,326

UNITED STATES PATENT OFFICE 2,457,326

TROLLEY GLIDER

William W. Sloane, Chicago, Ill., assignor to Goodman Manufacturing Company, Chicago, Ill., a corporation of Illinois Application March 2, 1945, Serial No. 580,593

4 Claims. (Cl. 191—59.1)

This invention relates to improvements in trolley gliders adapted to collect current from a trolley wire.

The principal objects of my invention are to provide a new and improved trolley glider particularly adapted to supply current to heavy duty mine locomotives without an undue amount of heating, and so arranged as to have substantially the same contact area in engagement with the trolley wire when the glider is sliding along a curved trolley wire as when sliding along a straight trolley wire.

One difficulty in designing current collectors of the trolley glider type for use in collecting current for heavy duty locomotives operable underground in mines, is that in underground operation the radius of curvature of the curves is relatively short with the result that the collector itself must be correspondingly short in order to properly operate around the curves and through switches and crossings. A short collector oftentimes does not have sufficient contact area to adequately supply the locomotive with current, and where the collecting surface is extended beyond the ends of the flanges of the collector, the collector frequently does not make full contact with the trolley wire when negotiating sharp turns where the heaviest loads are often encountered.

In carrying out my invention I provide a trolley glider wherein a portion only of the contact surface of said glider is flanged, to form a groove to retain the glider to the trolley wire, and I extend the ends of the contact surface beyond the ends of the groove and flare the ends of these contact surfaces laterally beyond the lateral limits of the flanges, so the contact surface will have substantially the same contact area in engagement with the trolley wire when in contact with a curving trolley wire as when in contact with a straight trolley wire. I also provide cooling fins on opposite sides of the glider to circulate the air therearound and to keep down the temperature of the glider, due to the heavy current loads, carried thereby, and also to cool the glider by radiation.

These and other objects of my invention will appear from time to time as the following specification proceeds and with reference to the accompanying drawings wherein.

Figure 1:
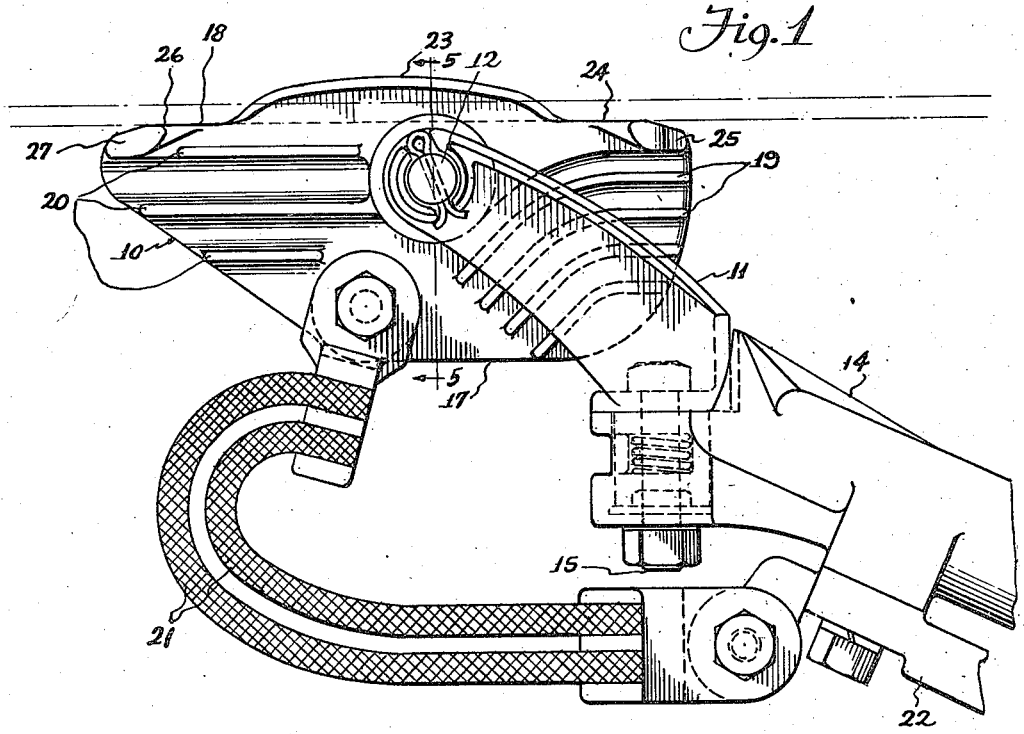
Figure 1 is a view in side elevation of a trolley glider mounted on the end of a trolley pole and shown in contact with a trolley wire.
Figure 2:
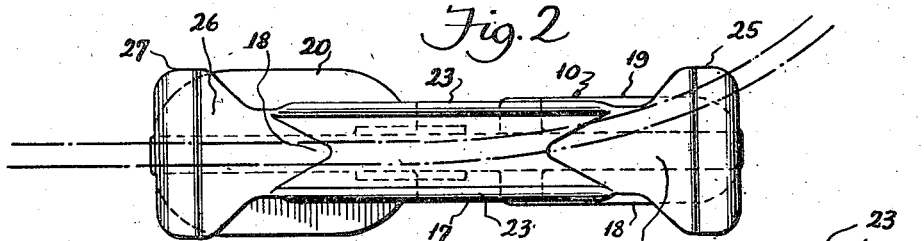
Figure 2 is a plan view of the glider shown in Figure 1.
Figure 3:
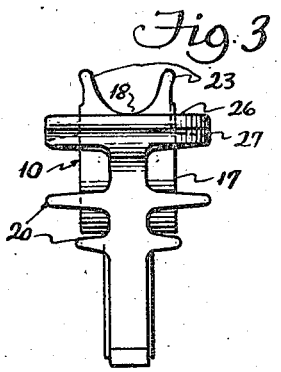
Figure 3 is a rear end view of the glider shown in Figure 1.
Figure 4:
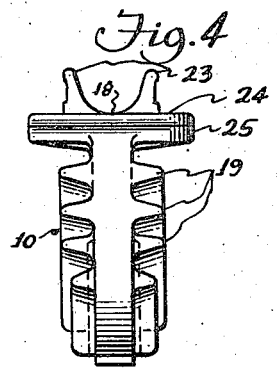
Figure 4 is a front end view of the glider shown in Figure 1.
Figure 5:
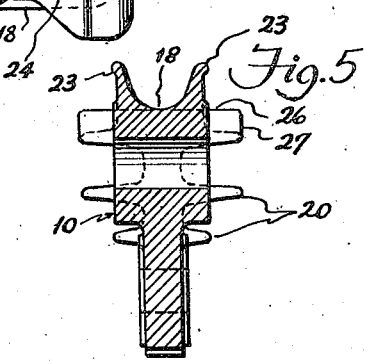
Figure 5 is a transverse sectional view of the glider, taken substantially along line 5—5 of Figure 1.

In the drawings a trolley glider 10 is pivotally mounted between the furcations of a bifurcated trolley harp 11 on a pivotal pin 12. Said harp in turn is pivoted on a socket 14 on an upright pivotal pin 15, which socket is mounted on the free end of a trolley pole (not shown). Said harp, socket, and trolley pole are of a construction well known to those skilled in the art and are no part of my present invention, so will not herein be shown or described in detail.

The trolley glider 10 includes a body portion 17 having an elongated upper contact surface 18. A plurality of cooling fins 19, 19 are spaced beneath the forward end of said contact surface and extend in parallel relation with respect thereto for a short distance, and then turn downwardly to direct the air along the forward portion of said glider and deflect it downwardly where it will then be carried to rear cooling fins 20, 20, extending to said contact surface and projecting laterally from the body of said glider. Said cooling fins 19, 19 and 20, 20 besides directing air to circulate along all portions of the body of said glider, to cool said glider by convection, also are so arranged as to effectively radiate the heat created by the heavy current loads carried during operation of the locomotive. Two flexible shunts 21, 21 connect said glider with a contact terminal 22 which is mounted beneath the socket 14. Said contact terminal is adapted to have a suitable electric conductor (not shown) connected thereto, to conduct current from said glider to the electrical operating parts of the locomotive.

The contact surface 18 of the trolley glider has a grooved central portion, the groove of which is formed by a pair of laterally spaced flanges 23, 23, extending along the opposite sides of said contact surface for a portion of its length and curved downwardly to the level of said contact surface at their ends. Said contact surface has an advance portion 24 extending forwardly of said flanges on the same level as the bottom of the groove thereof and flared outwardly beyond the lateral limits of said flanges in much the form of a beaver tail, to provide an outwardly flaring elongated contact surface beyond the advance ends of said flanges, which is sufficiently wide to afford substantially the same contact surface in engagement with the trolley wire when the glider is in contact with a curving trolley wire as when in contact with a straight trolley wire. The extreme advance end of said contact surface slopes downwardly to provide an inclined entering surface to said contact surface, and is in the form of a relatively heavy rib 25 which serves to aid the fins 19, 19 and 20, 20 to radiate the heat created by the heavy current loads passing through the glider.

In a like manner, the contact surface 18 has a retreating portion 26 extending rearwardly from the rear ends of the flanges 23, 23. Said portion is flared laterally beyond the lateral boundaries of said flanges to maintain engagement with the trolley wire when going around a curve, in much the same manner as the forward contact surface 24, and terminates in a downwardly sloping transversely extending rib 27, which aids in radiating the heat created by the heavy current loads passing through the glider.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. A current collector comprising a glider having an elongated upper contact surface adapted to collect current from a trolley wire, a portion of said contact surface being flanged to form a groove to retain said glider to the trolley wire, and the advance end of said contact surface being flared out beyond the lateral boundaries of said flanges to afford substantially the same contact surface with the trolley wire when in contact with a curving trolley wire as when in contact with a straight trolley wire, said end of said contact surface terminating into a relatively heavy rib extending transversely of the advance end of said glider to radiate the heat caused by the heavy current loads passing therethrough, and a plurality of cooling fins disposed beneath said contact surface and extending laterally from said glider to circulate the air around said glider upon movement thereof and to maintain said glider at a predetermined low temperature both by convection and radiation.

2. A current collector comprising a glider having an elongated upper contact surface adapted to collect current from a trolley wire, a portion of said contact surface being flanged to form a groove to retain said glider to the trolley wire, the advance end of said contact surface being flared out beyond the lateral boundaries of said flanges to afford substantially the same contact surface with the trolley wire when in contact with a curving trolley wire as when in contact with a straight trolley wire, said end of said contact surface terminating into a relatively heavy rib extending transversely of the advance end of said glider to radiate the heat caused by the heavy current loads passing therethrough, and a plurality of cooling fins disposed beneath said rib and inclined downwardly from said contact surface to circulate the air thereby, and other cooling fins disposed beneath the rear portion of said contact surface arranged to catch the air circulated by said first mentioned cooling fins and cause it to further circulate past said glider.

3. A current collector comprising a glider having an elongated upper contact surface adapted to engage and slide along a trolley wire for collecting current therefrom, said glider having spaced flanges extending along said contact surface for a portion of its length and forming a groove to retain said glider to the trolley wire, and said contact surface extending a substantial distance beyond the ends of said flanges and having opposite ends widened out beyond the lateral limits of said flanges a distance sufficient to afford substantially the same contact surface with the trolley wire when in contact with a curving trolley wire as when in contact with a straight trolley wire, the advance and rear ends of said contact surfaces terminating into relatively heavy ribs extending transversely of said glider to radiate the heat caused by the heavy current loads passing therethrough, and a plurality of cooling fins, disposed beneath said contact surface to circulate the air past said glider upon travel of said glider along the trolley wire, to maintain said glider at a relatively low temperature both by convection and radiation.

4. A current collector comprising a glider having an elongated upper contact surface adapted to engage and slide along a trolley wire for collecting current therefrom, said glider having spaced flanges extending along said contact surface for a portion of its length and forming a groove to retain said glider to the trolley wire, and said contact surface extending a substantial distance beyond the ends of said flanges and having opposite ends widened out beyond the lateral limits of said flanges a distance sufficient to afford substantially the same contact surface with the trolley wire when in contact with a curving trolley wire as when in contact with a straight trolley wire, the advance and rear ends of said contact surfaces terminating into relatively heavy ribs extending transversely of said glider to radiate the heat caused by the heavy current loads passing therethrough, a plurality of cooling fins, disposed beneath said contact surface to circulate the air past said glider upon travel of said glider along the trolley wire, to maintain said glider at a relatively low temperature both by convection and radiation, said cooling fins including a plurality of cooling fins disposed beneath said advance rib and extending parallel thereto and then being inclined downwardly to direct the air towards the lower rear portion of said glider, and a plurality of cooling fins disposed beneath the rear contact portion of said glider for catching the air currents set up by said first mentioned fins and directing the air along the rear portion of said glider.

WILLIAM W. SLOANE.

REFERENCES CITED

The following references are of record in the file of this patent:

UNITED STATES PATENTS

| Number | Name | Date |
|---|---|---|
| 1,027,756 | Prack | May 28, 1912 |
| 1,358,205 | Heydon | Nov. 9, 1920 |
| 1,817,175 | Chandler | Aug. 4, 1931 |